United States Patent [19]
Zwick

[11] Patent Number: 5,185,786
[45] Date of Patent: Feb. 9, 1993

[54] AUTOMATIC CALL CENTER OVERFLOW RETRIEVAL SYSTEM

[75] Inventor: Nicholas Zwick, Denville, N.J.

[73] Assignee: Dialogic Corporation, Parsippany, N.J.

[21] Appl. No.: 612,572

[22] Filed: Nov. 13, 1990

[51] Int. Cl.⁵ .................... H04M 3/42; H04M 1/56; H04M 3/00

[52] U.S. Cl. .................... 379/201; 379/142; 379/213; 379/309

[58] Field of Search .............. 379/201, 67, 88, 89, 379/142, 210, 211, 213, 214, 266, 309

[56] References Cited

U.S. PATENT DOCUMENTS

| | | | |
|---|---|---|---|
| 4,652,700 | 3/1987 | Matthews et al. | 379/89 X |
| 4,797,911 | 1/1989 | Szlam et al. | 379/67 |
| 4,829,563 | 5/1989 | Crockett et al. | 379/247 X |
| 4,896,345 | 1/1990 | Thorne | 379/67 |
| 4,924,491 | 5/1990 | Compton et al. | 379/201 X |

OTHER PUBLICATIONS

Bell Atlantic Publication entitled: "Repeat Call Return Call".

Primary Examiner—James L. Dwyer
Assistant Examiner—Harry S. Hong
Attorney, Agent, or Firm—Michael B. Einschlag

[57] ABSTRACT

Method and apparatus for recovering in-bound calls to a call center, which in-bound calls were directed to overflow. An embodiment of the inventive method includes the steps of: logging telephone numbers of in-bound calls that overflow the handling capacity of the call center, which telephone numbers are provided by the signaling capacity of the network to the call center; determining when call center agents become available; automatically initiating calls back to the logged telephone numbers; detecting when calls are answered; and causing call center agents to be connected thereto.

10 Claims, 6 Drawing Sheets

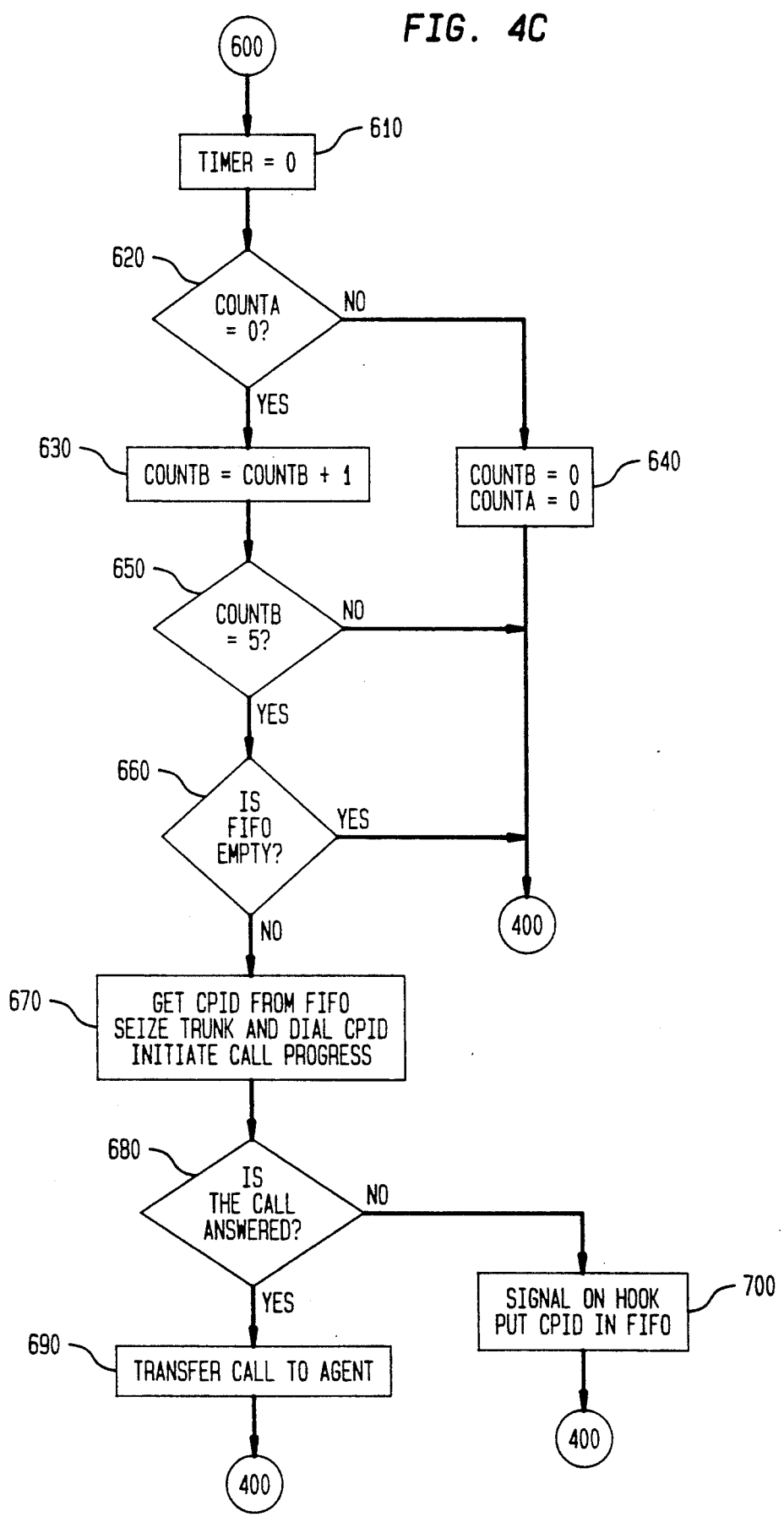

AUTOMATIC CALL CENTER OVERFLOW RETRIEVAL SYSTEM

TECHNICAL FIELD OF THE INVENTION

The present invention pertains to call processing systems and, in particular, to call processing systems which handle in-bound calls.

BACKGROUND OF THE INVENTION

FIG. 1 shows, in pictorial form, a typical call center arrangement which is used to handle volumes of in-bound calls. As shown in FIG. 1, the call center typically comprises a switch, for example, a switch like switch 100 which is configured as an Automatic Call Distributor (ACD). As is well known to those of ordinary skill in the art, the ACD function may reside at a public telephone company central office or at call center premises where it may be co-located with agents, such as $agent_1$–$agent_n$, that interface therewith.

In practice, certain call centers handle in-bound call activity which is unevenly distributed in time. In general, it is not economical or practical to staff such a call center with a number of agents which is sufficient to respond to each in-bound call that arrives during periods of peak demand. Such uneven in-bound call activity is typically found in call centers which are used to support telemarketing or fund raising activity where, for example, national network television advertising is used to stimulate in-bound calls. In such an environment, advertising typically stimulates creates a large surge in volume of in-bound calls immediately after an advertisement has run and such in-bound call activity typically diminishes substantially as time passes.

In practice, in-bound calls that are directed to the call center after the last available agent has accepted an in-bound call are typically given a busy signal, this occurrence being referred to as call overflow. As a result, when call overflow occurs, callers are denied access to the call center and, thereby, to the services or products he or she was calling to obtain. In addition, and perhaps most important from the point of view of the entity which supports the call center operation, the entity is denied the opportunity to obtain revenue from the caller by providing its services or by selling its products.

One method used in the art for decreasing the above-described lost revenue which results from call overflow is to put in-bound calls into a queue to wait for an agent to become available to handle the call. This approach suffers from several disadvantages. One disadvantage is that, if the in-bound call spends a long time in the queue, caller will often become impatient and hang up the telephone, resulting in lost opportunities to provide services or to sell products. Another disadvantage is that, if the call center utilizes "800" service to receive in-bound calls, the entity supporting the call center will pay for in-bound calls which are waiting in the queue, even though the callers are being provided no service.

In light of the above, there is a need for method and apparatus for recovering in-bound calls to, for example, a call center, which in-bound calls were directed to overflow and which in-bound calls were lost before the call center had an opportunity to provide service. In addition, there is a need for such a method and apparatus which can recover such in-bound calls at predetermined times such as, for example, at times when demand is low enough that call center agents are available to handle in-bound calls.

SUMMARY OF THE INVENTION

Embodiments of the present invention advantageously satisfy the above-identified need in the art by providing method and apparatus for use in, for example, a call center environment. Advantageously, use of such method and apparatus results in a call center having a large number of opportunities to provide service and/or to sell products to in-bound callers for a predetermined number of call center agents. Further, embodiments of the present invention are method and apparatus which augment switching facilities used to connect in-bound calls to call center agents. Still further, as will become apparent to those of ordinary skill in the art, embodiments of the present invention may be provided in the form of enhancements to existing switching equipment or in the form of auxiliary equipment which communicates directly with existing switching equipment.

More specifically, embodiments of the present invention are method and apparatus for recovering in-bound calls to a call center, which in-bound calls were directed to overflow and which in-bound calls may have been lost before the call center had an opportunity to provide service. Further, embodiments of the present invention are such method and apparatus which recover such in-bound calls at programmably predetermined times such as, for example, at times when demand is low enough that call center agents are available to handle in-bound calls.

In accordance with the present invention, an embodiment of the inventive method comprises the following steps: logging telephone numbers of in-bound calls that overflow the handling capacity of the call center, which telephone numbers are provided by the signaling capacity of the network to the call center; determining when a call center agent is available by interaction with a switch or in accordance with programmably predetermined schedules; automatically initiating a call back to a logged telephone number; detecting when the call is answered; and causing an available call center agent to be connected thereto.

As those of ordinary skill in the art will readily appreciate, embodiments of the present invention advantageously may utilize an Automatic Number Identification (ANI) service which is presently offered by major long distance carriers for their "800" service for determining the telephone number of an in-bound call. In addition, as those of ordinary skill in the art will readily appreciate, embodiments of the present invention advantageously may utilize out-bound predictive dialing systems for placing calls to the logged telephone numbers.

Further, embodiments of the present invention provide means for programmably setting schedules for calling telephone numbers which are logged in a large number of ways. For example, in one embodiment of the present invention, the schedules may be determined by interaction with a system administrator. In another embodiment of the present invention, the system may automatically interact with a call center system which provides notification when a particular agent is not busy.

Lastly, as should be clear to those of ordinary skill in the art, embodiments of the present invention may be comprised of means for re-attempting to place calls to telephone numbers which do not answer and such means may provide for re-attempting to place calls a programmably predetermined number of times as well as for providing reports of abandoned attempts and so forth.

BRIEF DESCRIPTION OF THE DRAWING

A complete understanding of the present invention may be gained by considering the following detailed description in conjunction with the accompanying drawing, in which:

FIGS. 4A-4C show a flowchart of logic used by the application processor to fabricate an embodiment of the present invention.

DETAILED DESCRIPTION

Figure 1:
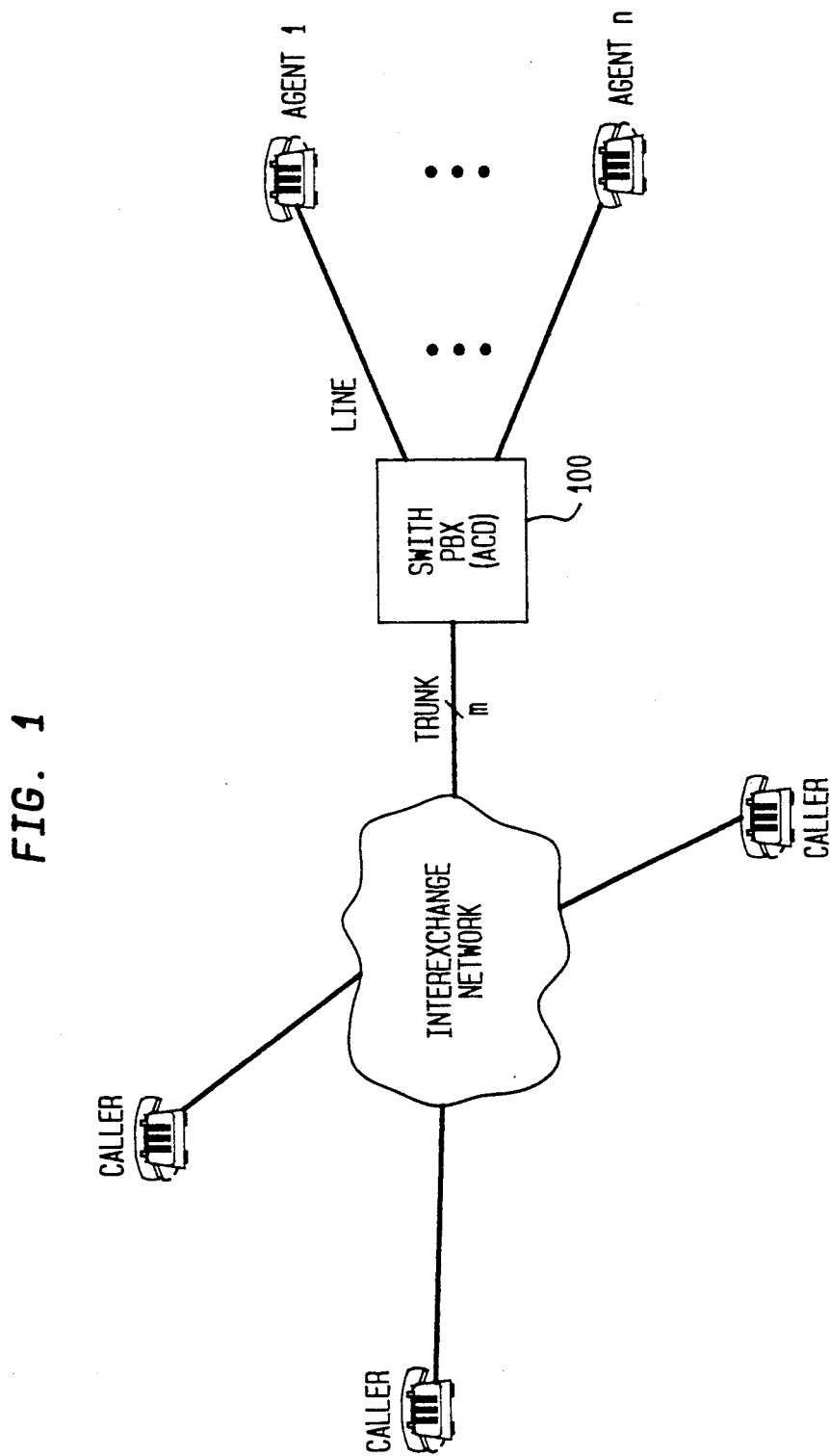
FIG. 1 shows, in pictorial form, a typical call center arrangement which is used to handle in-bound calls.
Figure 2:
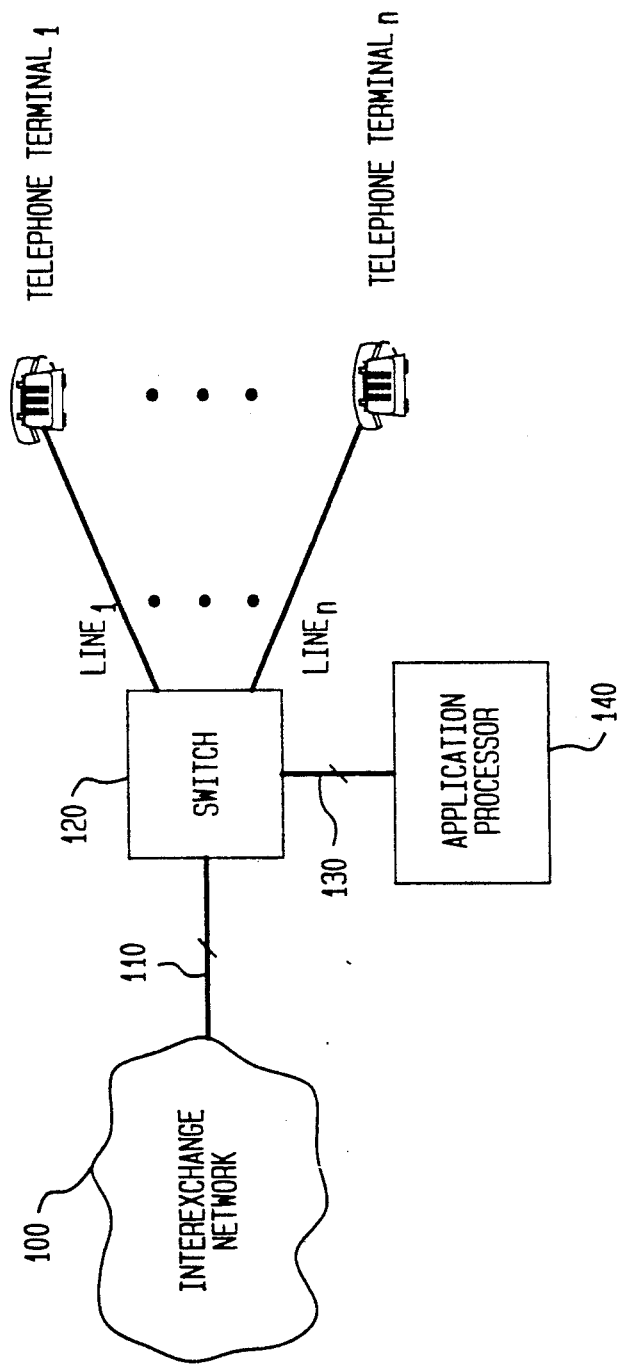
FIG. 2 shows, in pictorial form, an embodiment of the inventive automatic call center overflow retrieval system.

FIG. 2 shows, in pictorial form, an embodiment of the inventive automatic call center overflow retrieval system. Trunks 110 connect inter-exchange network 100 to call center switch 120. In practice, trunks 110 are typically T-1 trunks which are well known to those of ordinary skill in the art. In addition, switch 120 is connected by lines, i.e., $line_1$–$line_n$, to call center agent telephone terminals, i.e., call center agent telephone terminal$_1$–call center agent telephone terminal$_n$, respectively. In a typical case, the call center agent telephone terminals, i.e., call center agent telephone terminal$_1$–call center agent telephone terminal$_n$, are "2500 type" telephone sets and the lines, i.e., $line_1$–$line_n$ are standard loop start lines, both of which are well known to those of ordinary skill in the art. Of course, it should be clear to those of ordinary skill in the art that the present invention is not limited to the use of these kinds of telephone terminals and lines, respectively, and the present invention encompasses the use of a wide variety of different types of terminals and lines.

Switch 120 is connected to application processor 140 (AP 140) by tie trunks 130. As will be described in detail below, AP 140 provides overall logic and control for this embodiment of the present invention. In a typical case, tie trunks 130 which connect switch 120 and AP 140 are T-1 trunks. Further, switch 120 may be any type of switch which is well known to those of ordinary skill in the art such as an automated call distributor (ACD) or a private business exchange (PBX), also variously known as a PABX or a CBX. Still further, in other embodiments, switch 120 may be an end-office switch having Centrex capability which is provided by a local public telephone operating company.

We now proceed to describe how the above-described embodiment of the present invention operates in general. First, assume that an advertisement has been placed, for example, on national television. Further assume that the advertisement informs the public that it may obtain a particular service or purchase a particular product by dialing a particular "800" number. In accordance with the present invention, callers desiring to obtain the service or to purchase the product from a call center serviced by agents at call center agent telephone terminals such as terminal$_1$–terminal$_n$, dial the advertised "800" number. These calls are routed, by inter-exchange network 100, to one of trunks 110 which are connected to switch 120. In accordance with the present invention, such calls will include automatic number identification (ANI) signaling which provides calling party identification (CPID). A number of long distance companies offer this ANI service such as, for example, MCI's 800 Enhanced Service Package (ESP) (MCI is a trademark and MCI 800 ESP is a service mark of MCI Communications Corporation) and AT&T's INFO 2 (AT&T is a trademark and AT&T INFO 2 is a service mark of the American Telephone and Telegraph Company).

Switch 120 may be configured, in a manner which is well known to those of ordinary skill in the art, to "hunt" for call center agents whose terminals are available to receive an in-bound call or switch 120 may be configured, in a manner which is also well known to those of ordinary skill in the art, to connect in-bound calls to call center agents whose terminals are available to receive the call using predetermined distribution patterns such as, for example, a uniform distribution pattern. Nevertheless, the present invention is not limited to the use of any particular method for determining the availability of agents for receiving in-bound calls.

If switch 120 finds an available call center agent, it provides a connection between the particular one of trunks 110 which transmits the in-bound call and the particular one of $line_1$–$line_n$ which is connected to the terminal for the available agent. In addition, switch 120 may signal the agent that a call is being connected by ringing the agent's telephone terminal or by other methods which are well known to those of ordinary skill in the art such as, for example, by sending a signal to a call center host processor (not shown) which provides information to call center agents at display terminals used by the agents.

If switch 120 finds no agent who is available to respond to the in-bound call, then, in a manner which is well known to those of ordinary skill in the art, switch 120 sends the calls to AP 140 over one of tie trunks 130. AP 140 captures the CPID information sent to switch 120 by inter-exchange network 100. As is well known to those of ordinary skill in the art, such CPID information can be delivered in-band in the form of, for example, dual tone multifrequency (DTMF) signals or multifrequency (MF) signals or such CPID information can be delivered out-of-band using ISDN-based services such as AT&T's INFO 2 offering. In either case, it should be clear that the present invention encompasses the use of both in-band and out-of-band signaling.

The following describes an embodiment which utilizes in-band signaling. AP 140 captures CPID information transmitted by inter-exchange network 100 using the well known in-band, single stage ANI protocol. AP 140 saves the CPID for an overflow in-bound call in, for example, a memory register. In a preferred embodiment of the present invention, a multiplicity of memory registers for holding multiple overflow CPIDs is a first-in-first-out (FIFO) type register arrangement which is well known to those of ordinary skill in the art. AP 140 then provides a busy signal to the in-bound calling party to induce that party to hang up its telephone. In addition, since no answer supervision is provided back toward inter-exchange network 100, no billing is generated for this un-completed call to the call center.

AP 140 maintains an interval timer of a predetermined time interval, for example, a fixed time interval. AP 140 also maintains a count of the number of overflow calls it receives during each interval and the overflow counter may be reset at the beginning of each interval. AP 140 determines that the in-bound call overflow condition has abated and that at least one call center agent is available for providing service when the count value is zero for a predetermined number of consecutive intervals.

When AP 140 determines that the in-bound call overflow condition has abated, and when FIFO memory contains at least one stored CPID, AP 140 will initiate a call to that telephone number. This is accomplished by: (a) causing one of tie trunks 130 to signal switch 120 to seize one of network trunks 110; (b) retrieving the stored telephone number from FIFO memory; and (c) dialing the telephone number. In a preferred embodiment, the network trunk which is seized is one that could carry an in-bound call to switch 120. This is preferred because it increases the probability that a call center agent will still be available to handle the call when a connection is made. AP 140 monitors the progress of the call to determine whether the call is answered in accordance with any one of a large number of methods which are known in the art for analyzing call progress. If AP 140 determines that the call is answered, AP 140 signals switch 140 to transfer the call to an available call center agent. On the other hand, if AP 140 determines that the call was not answered, AP 140 terminates the call by signaling an "on hook" and, then, AP 140 stores the CPID used for this attempted call back in FIFO memory.

As one can readily appreciate, the above-described embodiment of the inventive method has referred to one particular embodiment for storing in-bound calls which overflow and for determining when the overflow has subsided. It should be clear to those of ordinary skill in the art that the present invention is not limited to the above-described embodiment. For example, the CPID information for in-bound overflow calls may be stored in auxiliary storage devices such as, for example, bubble memories, disks, and so forth. Further, AP 140 may receive notification of call center agent availability from a call center host processor (not shown) which monitors call center agent activity. Still further, call re-attempt intervals may be changed by call center administrators by interactive input with AP 140 or by means of input from the call center host processor. Yet still further, administration reporting modules in AP 140 may monitor re-attempt failures and lists thereof may be provided to system administrators off-line or they may be reported directly to the call center host processor.

Figure 3:
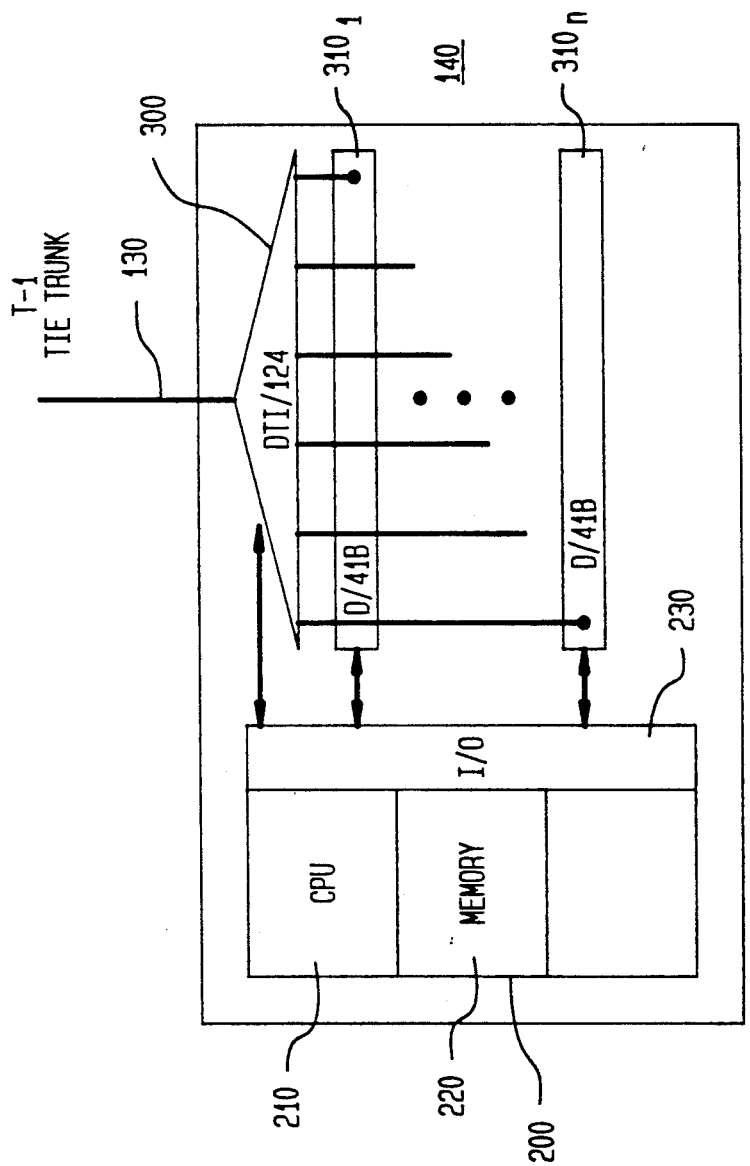
FIG. 3 shows a block diagram of an application processor which is used to fabricate an embodiment of the present invention.

FIG. 3 shows a block diagram of an embodiment of AP 140. AP 140 is comprised of processor 200. Processor 200 may be, for example, an IBM PC-AT processor or a comparable or compatible processor. Processor 200 is typically comprised of a central processing unit, for example, CPU 210, which executes the logic stored in memory, for example, memory 220. In addition, processor 200 is comprised of I/O interface 230 which interfaces with modules 300 and $310_1$–$310_n$. The manner in which the components of processor 200 are interrelated and operate are well known to those of ordinary skill in the art.

Modules 300 and $310_1$–$310_n$ interface T-1 tie trunks 130 with processor 200 and are fabricated from components which are available from Dialogic Corporation of Parsippany, New Jersey and which are configured and operate in accordance with Application Note AN015 entitled "Use of Dialogic Components in Automatic Number Identification (ANI) Systems" which is published by Dialogic Corporation. Specifically, as shown in FIG. 3, and as described in the application note, for most high-volume calling environments, T-1 is the preferred transmission method and Dialogic's DT/1xx equipment provides T-1/DS-1 service termination. As such, and as shown in FIG. 3, module 300, a DTI/124, is utilized to connect to a channel service unit which interconnects to the T-1 circuitry of tie trunks 130. The DTI/124 can be utilized as a T-1 terminating device or as a drop and insert device. When configured as a terminating device, as shown in FIG. 3, DTI/124, i.e., module 300, connects to Dialogic D/4×B (in this case D/41B) boards, i.e., modules $310_1$–module $310_n$. Further, as shown in FIG. 3, modules 300 and $300_1$–$300_n$ interface with processor 210 through I/O 230. The number of D/41B boards used depends on whether or not a one-to-one ratio of voice response and digit collection ports to incoming lines is required. If the in-band ANI service requires MF detection, MF/40 daughterboards will be required for each D/41B board in the system to receive the ANI. Further, additional D/41B and MF/40 components may be required for dialing into switch 140. In addition, the detailed description of the interaction between processor 200 and modules 300–$310_1$ to $310_n$ are described in the applications note for functions to support the above described call processing steps. As such, the applications note is incorporated by reference herein. The operation of module 300 and modules $300_1$–$300_n$ are also described in U.S. Pat. No. 4,852,149 issued Jul. 25, 1989.

Figure 4A:
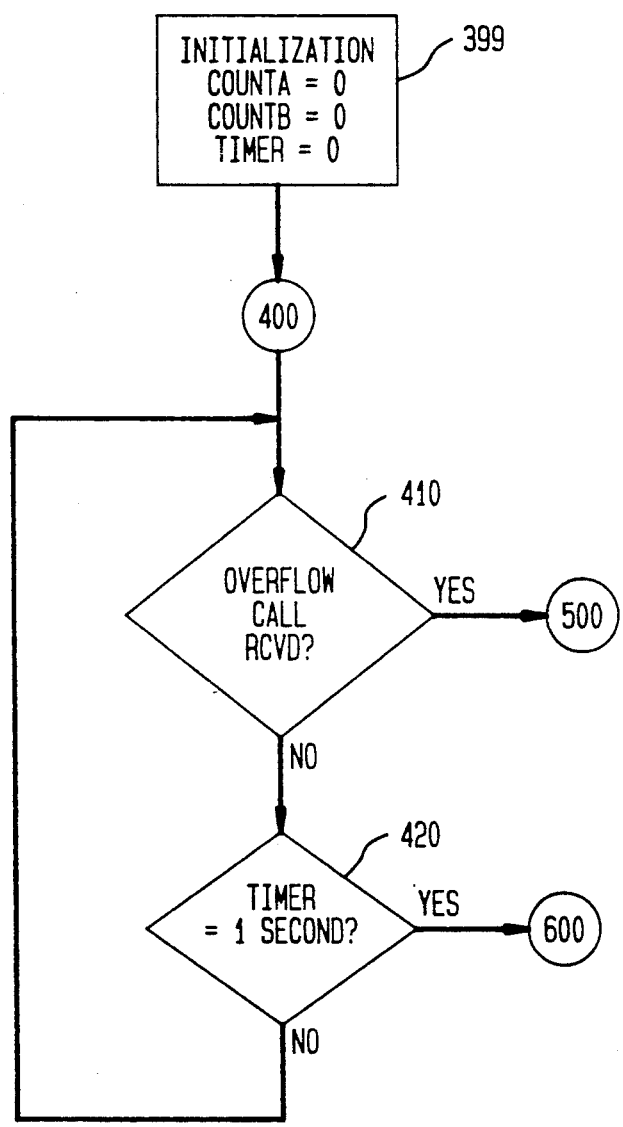
Figure 4B:
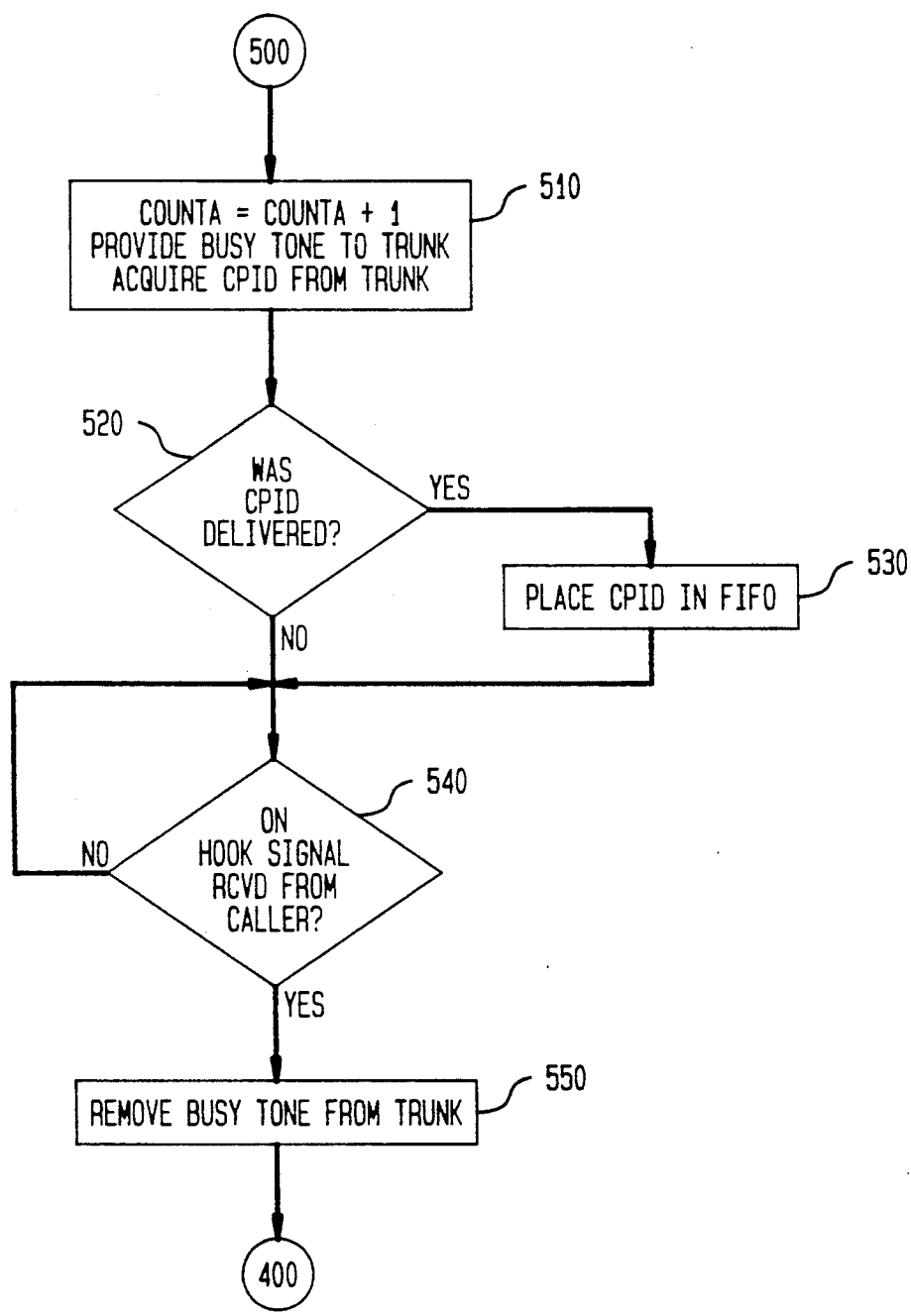

FIGS. 4A–4C show a flowchart of logic which is used by AP 140 in carrying out the above-described embodiment of the present invention. At box 399 of FIG. 4A, initialization is performed, i.e., COUNTA, COUNTB, and TIMER are all set equal to 0. Then, control is transferred to sequence 400 of FIG. 4A.

At sequence 400 of FIG. 4A, decision box 410 determines whether an in-bound overflow call is received by AP 140. If so, control is transferred to sequence 500 of FIG. 4B, otherwise, control is transferred to decision box 420.

Decision box 420 determines whether TIMER is equal to 1 second. If so, control is transferred to sequence 600 of FIG. 4C, otherwise, control is transferred to decision box 410.

At sequence 500 of FIG. 4B, box 510 increments COUNTA by 1, provides a busy tone to the trunk for the in-bound overflow call, and acquires the CPID for the in-bound call from the trunk. Then, control is transferred to decision box 520.

Decision box 520 determines whether a CPID was delivered. If so, control is transferred to box 530, otherwise, control is transferred to decision box 540.

At box 530, the CPID is stored by placing it into a FIFO. Then, control is transferred to decision box 540.

Decision box 540 determines whether an on-hook signal is received from the in-bound calling party. If so, control is transferred to box 550, otherwise, control is transferred to decision 540 to wait for the in-bound calling party to hang up the telephone.

At box 550, the busy tone is removed from the trunk. Then, control is transferred back to sequence 400 of FIG. 4A.

At sequence 600 of FIG. 4C, box 610 sets TIMER=0. Then, control is transferred to decision box 620.

Decision box 620 determines whether COUNTA equal 0. If so, control is transferred to box 630, otherwise, control is transferred to box 640.

At box 630, COUNTB is incremented by 1. Then, control is transferred to decision box 650.

At box 640, COUNTA and COUNTB are set equal to 0. Then, control is transferred to sequence 400 of FIG. 4A.

Decision box 650 determines whether COUNTB is equal to 5. If so, control is transferred to decision box 660, otherwise, control is transferred to sequence 400 of FIG. 4A.

Decision box 660 determines whether the FIFO is empty. If so, control is transferred to sequence 400 of FIG. 4A, otherwise, control is transferred to box 670.

At box 670, a CPID is obtained from the FIFO, a trunk is seized, the CPID is dialed, and call progress monitoring is initiated. Then, control is transferred to decision box 680.

Decision box 680 determines whether the call is answered. If so, control is transferred to box 690, otherwise, control is transferred to box 700.

At box 690, the call is transferred to an available agent. Then, control is transferred to sequence 400 of FIG. 4A.

At box 700, signal an on-hook to the trunk and store the CPID back on the FIFO. Then, control is transferred to sequence 400 of FIG. 4A.

Those skilled in the art recognize that further embodiments of the present invention may be made without departing from its teachings. For example, although it is not typically done today, in the future, it is expected that vendors of call center switches will provide specifications for standard communications links with their switch units that will enable the exchange of information, like that described above, and the exchange of control commands, like those described above, to flow between the call center switches and the application processor (AP) of embodiments of the present invention. Examples of such communications links are the CIT link used by Northern Telecom for its SL-1 PBX and the ASAI link used by AT&T. Embodiments of the present invention which utilize communications links with call center switches are advantageous in that there is no duplication of trunking equipment, there can be deterministic information relating to the status of the call center agent load which is provided to the AP, and there is the possibility of faster performance. Such advantages are therefore expected to be obtained in the future when such communications links are operative and the specifications are publicly disseminated.

What is claimed is:

1. A method for automatically handling in-bound call overflow which comprises the steps of:
   acquiring a calling telephone number for an in-bound call to a system, which calling telephone number is provided by the signaling capacity of a network;
   providing a signal which causes a busy signal to be sent to the calling party telephone number for an in-bound call that cannot be serviced;
   storing the calling telephone number of an in-bound call that cannot be serviced; and
   automatically initiating an out-bound call to the calling telephone telephone number at a later time.

2. The method of claim 1 wherein the step of automatically initiating an out-bound call comprises the step of:
   initiating the out-bound call to the calling telephone number in response to a signal received from the system.

3. The method of claim 1 wherein the step of automatically initiating an out-bound call comprises the step of:
   automatically initiating the out-bound call to the calling telephone number in response to a predetermined schedule.

4. The method of claim 1 wherein the step of automatically initiating an out-bound call comprises determining the later time in accordance with a predictive dialing method.

5. The method of claim 1 wherein the step of automatically initiating an out-bound call comprises the steps of:
   automatically determining when the system has resources available for handling a call to the calling telephone number; and
   automatically initiating an out-bound call to the calling telephone number.

6. The method of claim 5 which further comprises the steps of:
   determining whether the out-bound call to the calling telephone number is answered; and
   connecting a system resource to the call if the call is answered.

7. The method of claim 6 wherein the step of determining whether the out-bound call is answered further comprises the steps of:
   determining whether the out-bound call is not answered and, if so,
   reporting the same.

8. The method of claim 6 wherein the step of determining whether the out-bound call is answered further comprises the steps of:
   determining whether the out-bound call is not answered and, of so,
   storing the calling telephone number of the unanswered out-bound call.

9. The method of claim 8 which further comprises the step of:
   automatically initiating an out-bound call to the telephone number of the unanswered out-bound call at a later time.

10. Apparatus for automatically handling in-bound call overflow which comprises the steps of:
    means for acquiring a calling telephone number for an in-bound call to a system, which calling telephone number is provided by the signaling capacity of a network;
    means for providing a signal which causes a busy signal to sent to the calling party telephone number for an in-bound call that cannot be serviced;
    means for storing the calling telephone number of an in-bound call that cannot be serviced; and
    means for automatically initiating an out-bound call to the calling telephone telephone number at a later time.

* * * * *